Sept. 25, 1928.
W. J. CAMPBELL
SLICING MACHINE
Filed Nov. 26, 1926
1,685,271
2 Sheets-Sheet 1
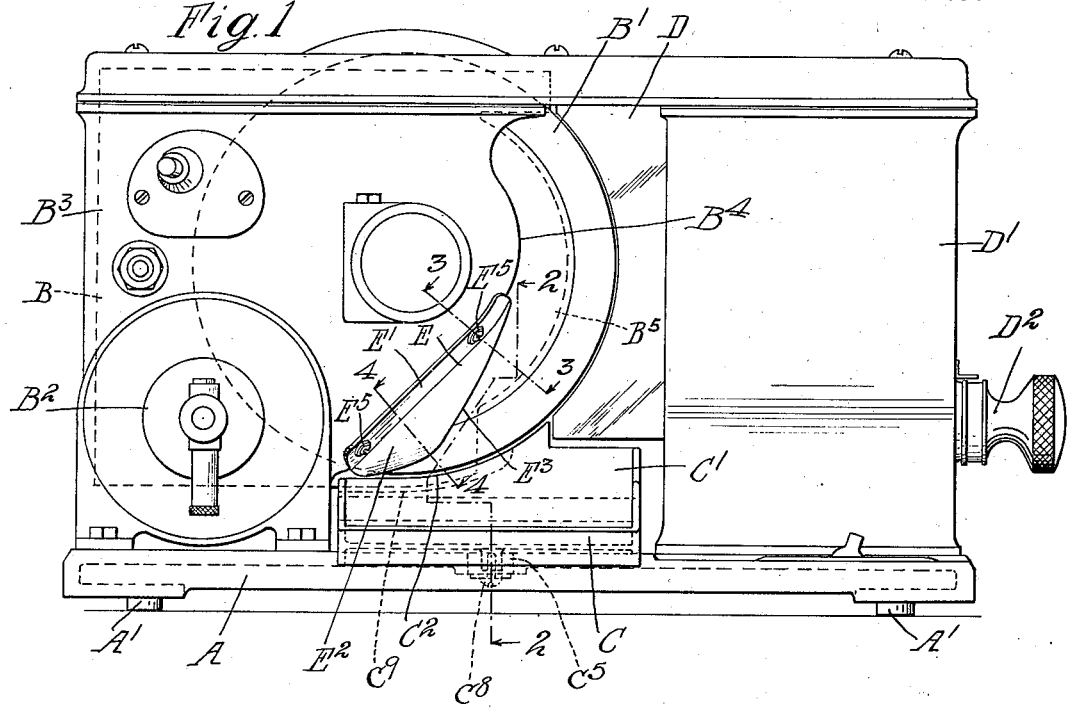
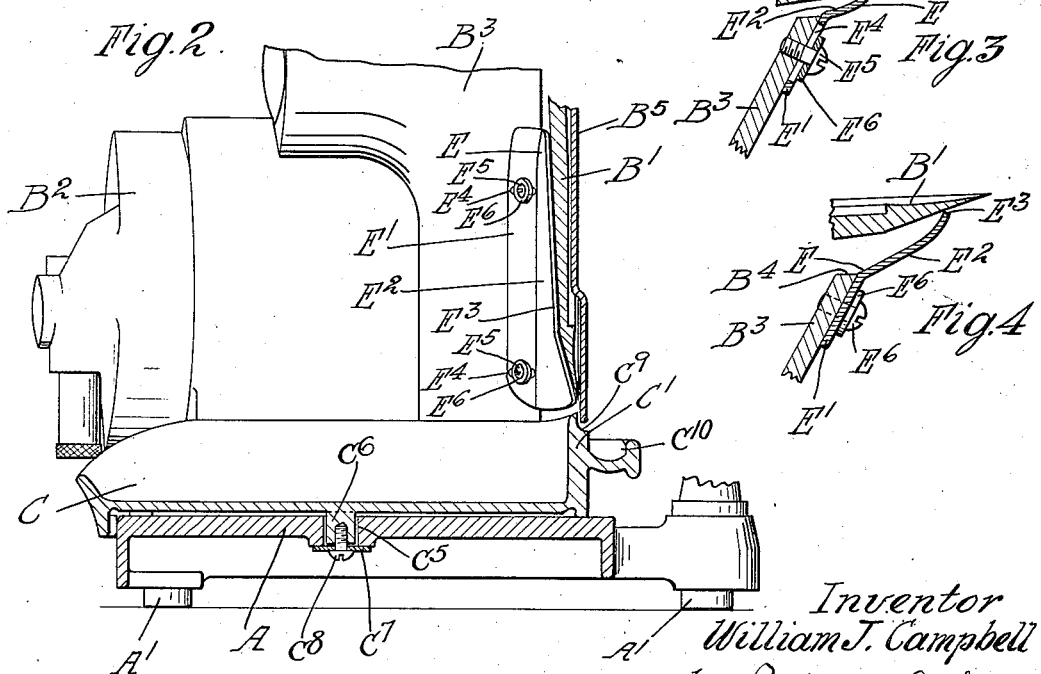
Inventor
William J. Campbell
by Parker & Carter
Attorneys Sept. 25, 1928.  
W. J. CAMPBELL  
SLICING MACHINE  
Filed Nov. 26, 1926  
1,685,271  
2 Sheets-Sheet 2
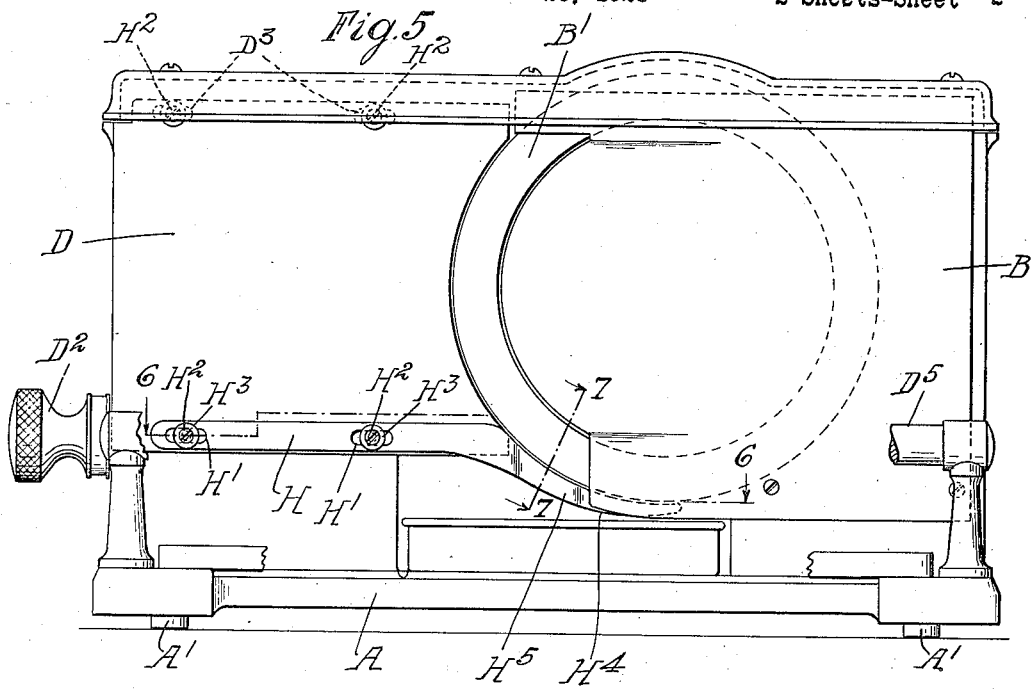
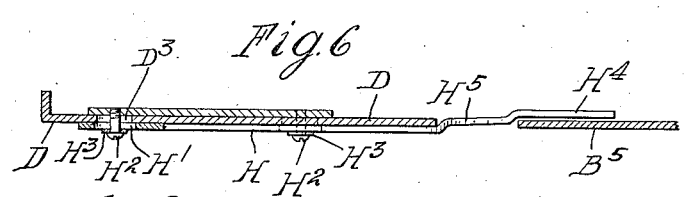
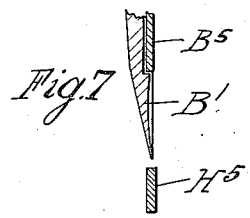
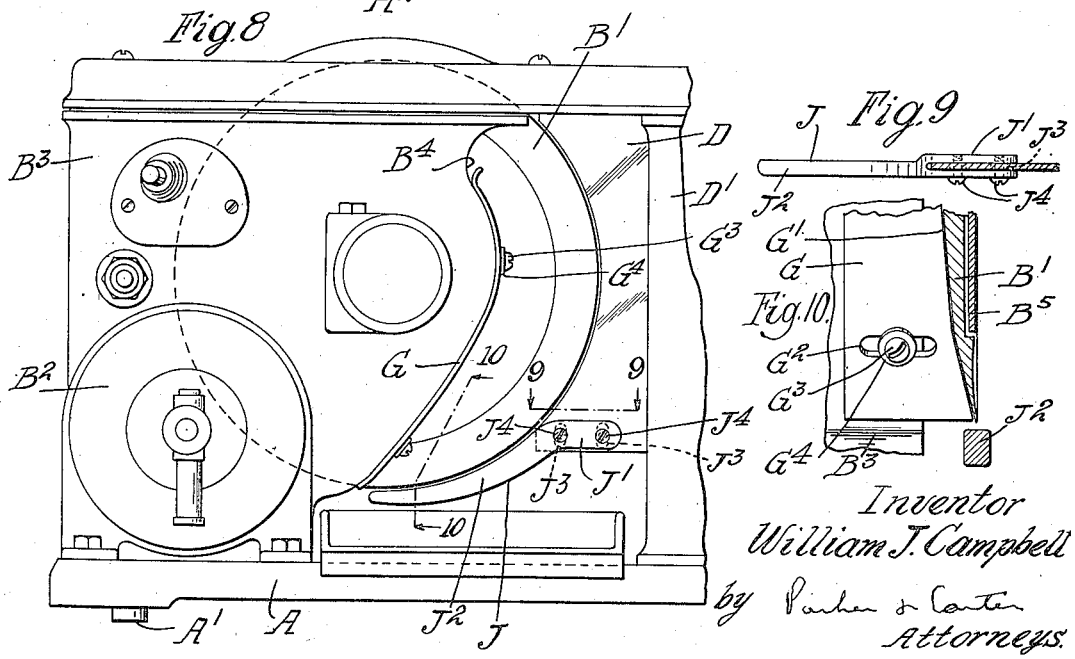
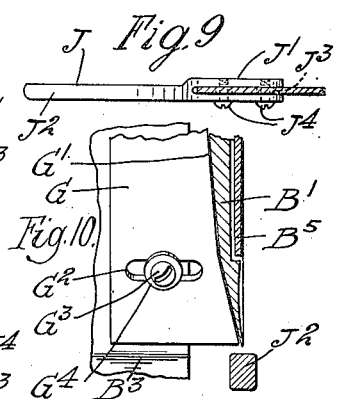
Inventor  
William J. Campbell  
by Parker & Carter  
Attorneys.

Patented Sept. 25, 1928.

1,685,271

UNITED STATES PATENT OFFICE.

WILLIAM J. CAMPBELL, OF INDIANAPOLIS, INDIANA, ASSIGNOR TO AMERICAN SLICING MACHINE COMPANY, OF CHICAGO, ILLINOIS, A CORPORATION OF NEW YORK.

SLICING MACHINE.

Application filed November 26, 1926. Serial No. 150,712.

My invention relates to an improvement in slicing machines. One object is the provision of a deflector for use with slicing machines having rotary cutting knives. Another object is the provision of guard means, in association with such deflectors, to protect the operator from the knife during normal operation of the machine and during adjustment or cleaning of the deflector plates. Other objects will appear from time to time in the course of the specification and claims.

I illustrate my invention more or less diagrammatically in the accompanying drawings, wherein—

Figure 1 is an elevation;
Figure 2 is a section on the line 2—2 of Figure 1;
Figure 3 is a section on the line 3—3 of Figure 1;
Figure 4 is a section on the line 4—4 of Figure 1;
Figure 5 is an elevation of the opposite side of the machine; showing a variant form;
Figure 6 is a section on the line 6—6 of Figure 5;
Figure 7 is a section on the line 7—7 of Figure 5;
Figure 8 is an elevation, similar to Figure 1, of a variant form;
Figure 9 is a section on the line 9—9 of Figure 8; and
Figure 10 is a section on the line 10—10 of Figure 8.

Like parts are illustrated by like symbols throughout the specification and drawings.

Referring to the drawings A is any suitable base frame member having any suitable supporting studs $A^1$.

B is any suitable upwardly projecting knife housing, the housing and the supporting frame therefor, the details of which form no part of the present invention, not being indicated in great detail. $B^1$ indicates the rotary knife and $B^2$ any suitable motor means for rotating it. $B^3$ is the rear of the knife enclosing housing which is cut away or terminates along the line $B^4$, exposing a portion of the knife blade from the rear.

C indicates the receiving tray upon which the slices fall as they leave the knife. In Figure 1 the tray is indicated as having an upwardly extending wall $C^1$ with an arcuately cut away portion $C^2$ generally conforming to the edge of the knife and serving as a guard or protection to limit the movement of the hand of the operator toward the knife edge.

Referring to Figures 1 and 2, the tray C is shown as laterally adjustable along the device in order to move the arcuate portion toward and away from the edge of the knife. Thus it is possible to conform to various sizes of knives and to allow for wear. The adjusting members include a slot $C^5$ in the frame A, a stud $C^6$ depending from the tray C, penetrating said slot, and a locking washer $C^7$ with a locking screw $C^8$.

The forward or arcuate portion of the tray is cut away or recessed as at $C^9$ along the greater portion of its length in order to receive the lower edge of the normally fixed guard plate $B^5$. This disposition is shown in cross-section in Figure 2. $C^{10}$ indicates a forward ledge on the tray which may receive any bits of material dropping from or thrown from the forward face of the knife.

D indicates a gauge plate movable toward and away from the cutting plane of the knife and $D^1$ is a housing the front of which is closed by said gauge plate. $D^2$ is any suitable means, herein shown as a rotary knob, for actuating the gauge plate controlling mechanism within the housing $D^1$. The actuating mechanism for the gauge plate forms of itself no part of the present invention and is therefore not indicated in detail.

It will be understood that the gauge plate D is also adjustable toward and away from the knife edge, it being provided for example with the slots $D^3$ through which pass any suitable securing means, for example the screws $H^2$.

It will be realized that any suitable means may be employed for conveying the meat to be cut past the knife edge, whereby at each excursion of the meat or the material being cut a slice is severed by the knife and falls upon the plate C. $D^5$ indicates a track upon which a reciprocating meat carriage may be mounted.

It is desirable that the slices of meat cut by the knife be cleared from the face of the knife in order that they may drop freely upon the plate C. It is even more important that small fragments of meat be also cleared from the knife face in order that they may not be carried into the housing or toward the knife and in order to prevent the gathering in the machine of bits of meat which, by their putrefaction, might cause unsanitary and unappetizing conditions. I therefore provide a deflector plate having an edge generally conforming to and closely engaging the inner face of the knife. Referring to Figure 1 I indicate a plate E having a portion $E^1$ conforming to the opposed face of the housing $B^3$ and a portion $E^2$ extending thence to close proximity with the face of the plate. I preferably form the blade portion $E^2$ with an inclined edge $E^3$, inclined outwardly across the normal path imparted to the meat slices or fragments by the rotation of the knife. The angle between such edge and the rotated pieces and particles is, however, an acute one and they are therefore thrust outwardly thereby toward the edge of the knife with a minimum tendency to gather against the deflector or to resist the action of the deflector. As the particles or pieces are fed outwardly towards the periphery of the knife, their movement is accentuated by the increased centrifugal force caused by the increasing distance from the center of rotation of the knife.

In order to permit adjustment of the deflector in relation to the knife I provide the slots $E^4$ in the base portion $E^1$ through which pass the locking members or screws $E^5$ with the clamping washers $E^6$. An accurate adjustment is thus possible in relation to any size or thickness of knife.

In Figure 8 a somewhat different form of deflector is illustrated in which a deflector body G instead of being inclined with relation to the face of the knife is generally perpendicular to it, its inner edge $G^1$ conforming to the contour of the knife blade as shown in Figure 10. The deflector is shown as bent or formed to conform to the edge $B^4$ of the housing $B^3$ and, so formed, acts as does the deflector portion $E^3$ to urge the slices and particles of meat outwardly toward the periphery of the knife. It is provided also with adjusting and securing slots $G^2$ for the securing screws $G^3$ with their washers $G^4$ as shown in Figure 10.

In order to permit a safe adjustment of the scraper or deflector in the form shown in Figure 1, I form the receiving tray C with the rear protecting wall $C^1$, as above described. It often happens that it is desirable to employ a lower tray or even to dispense with the removable tray altogether. I may therefore in such case provide for independent guard means. In the form shown in Figure 5 I employ a guard member having a body portion H secured to the front of the gauge plate D and adjustable thereon for example by the slots $H^1$ which receive the receiving members $H^2$ with the lock washer $H^3$. $H^4$ is an arcuate extension from the inner end thereof with the inward crook $H^5$ which serves to bring it to the rear of the cutting plane of the knife. In the form of Figure 8 I substitute for the member H a similar member J having a portion $J^1$ secured to the rear of the gauge plate D and an arcuate portion $J^2$ extending therefrom in proper protecting position in relation to the exposed lower arc of the knife. $J^3$ are adjusting slots to receive the locking or securing members $J^4$.

It will be realized that whereas I have described and shown a practical and operative device, nevertheless many changes might be made in the size, shape, number and disposition of parts without departing from the spirit of my invention. I therefore wish my description and drawings to be taken as in a broad sense illustrative and diagrammatic rather than as limiting me to my specific showing.

The use and operation of my invention are as follows:

In the form of my device illustrated in Figure 1 I employ a deflector secured to the rear of the housing and having an inclined blade portion $E^2$ with an edge $E^3$ engaging or extending close to the rear face of the knife. The edge $E^3$ is so formed or curved and inclined in relation to the path of the knife and of the particles and slices cut by it as to deflect them gradually to the periphery of the knife. The deflector G of Figure 8 has the same function but differs from the deflector E in the inclination of the deflector blade to the plane of the knife, it being generally perpendicular to the knife whereas the member $E^2$ is inclined at a relatively acute angle as shown in Figures 3 and 4. In the case of each form adjustment is affected by adjusting slots or apertures which are not only long enough to permit longitudinal adjustment therealong but are of greater width than the stems of the screws passing through them, thus permitting adjustment in two main planes and intermediate or tilting adjustments as well.

In the form of Figure 1 the rear edge $C^1$ of the tray C is formed to protect the lower exposed arc of the knife. In the forms of Figures 5 and 8 a separate guard member is employed, secured in one case to the forward and in the other case to the rearward face of the gauge plate. This permits the use of a tray, detachable or otherwise, of any desired form. In each case the guard member is completely adjustable by means of a plurality of adjusting slots of such width as to permit lateral as well as longitudinal adjustment in relation to the securing screws or pins. Thus the arcuate portion $H^4$ or $J^2$ can be accurately adjusted in relation to the edge of the knife and can be centered concentric with the axis of rotation.

I claim:

1. The combination with a slicing machine having a rotary knife and means for rotating it, of a slice receiving member and a guard for the edge of the knife, integral with said member and conforming generally to the arc of the edge of the knife, said guard extending across the breadth of said receiving member, rearwardly of said knife, and extending upwardly to general alignment with the knife edge.

2. The combination with a slicing machine having a rotary knife and means for rotating it and a forward guard plate for said knife, of a receiving member and an inner edge thereof adapted to serve as a knife edge guard, said edge being recessed to receive the lower edge of said guard plate.

3. The combination with a slicing machine and a rotary knife and means for rotating it, of a receiving member, having an inner guard portion conforming generally to the arcuate edge of the knife and a forward receiving portion positioned on the opposite side of said guard portion from the body of the receiving member.

4. The combination with a slicing machine having a rotary knife and means for rotating it, of means, opposed to one face of the knife, adapted to cause movement of particles, carried on the face of the knife, outwardly toward the periphery of the knife, said means including a deflector member one edge of which closely approaches and conforms to the face of the knife, the edge of such deflector member extending from a point well within the periphery of the knife to the edge of the knife, such edge being inclined to the radius of the knife, and outwardly inclined across the paths imparted by the knife to particles adhering to or travelling upon the face of the knife.

5. The combination with a slicing machine having a rotary knife and means for rotating it, of means, opposed to one face of the knife, adapted to cause movement of particles, carried on the face of the knife, outwardly toward the periphery of the knife, said means including a deflector member one edge of which closely approaches and conforms to the face of the knife, the edge of such deflector member extending from a point well within the periphery of the knife to the edge of the knife, such edge being acutely inclined to the radius of the knife, and outwardly inclined across the paths imparted by the knife to particles adhering to or travelling upon the face of the knife.

6. The combination with a slicing machine having a rotary knife and means for rotating it, of a slice receiving member and a guard for the edge of the knife, conforming generally to the arc or the edge of the knife and normally fixed in relation to said slice receiving member.

Signed at Indianapolis, county of Marion, and State of Indiana, this 19th day of November, 1926.

WILLIAM J. CAMPBELL.